(12) United States Patent
Hongo

(10) Patent No.: US 6,677,969 B1
(45) Date of Patent: Jan. 13, 2004

(54) INSTRUCTION RECOGNITION SYSTEM HAVING GESTURE RECOGNITION FUNCTION

(75) Inventor: Hitoshi Hongo, Gifu (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 09/404,877

(22) Filed: Sep. 24, 1999

(30) Foreign Application Priority Data

Sep. 25, 1998 (JP) .......................... 10-288812
Sep. 21, 1999 (JP) .......................... 11-266873

(51) Int. Cl.[7] ................................ G09G 5/00
(52) U.S. Cl. .................. 345/863; 345/179; 345/156; 348/734
(58) Field of Search ................. 345/863, 700, 345/179, 156, 860, 157, 701, 702; 382/186, 187, 202, 118; 704/251

(56) References Cited

U.S. PATENT DOCUMENTS

| 5,335,657 | A | * | 8/1994 | Terry, Jr. et al. ............... 607/45 |
| 5,864,808 | A | * | 1/1999 | Ando et al. .................. 704/251 |
| 6,097,392 | A | * | 8/2000 | Leyerle ....................... 345/358 |
| 6,111,580 | A | * | 8/2000 | Kazama et al. ............. 345/358 |
| 6,118,888 | A | * | 9/2000 | Chino et al. ................. 382/118 |
| 6,191,773 | B1 | * | 2/2001 | Maruno et al. ............. 345/158 |
| 6,204,852 | B1 | * | 3/2001 | Kumar et al. ............... 345/419 |
| 6,498,628 | B2 | * | 12/2002 | Iwamura ..................... 345/157 |

FOREIGN PATENT DOCUMENTS

JP          9-218770          8/1997

* cited by examiner

*Primary Examiner*—Kristine Kincaid
*Assistant Examiner*—Mylinh Tran
(74) *Attorney, Agent, or Firm*—Westerman, Hattori, Daniels & Adrian, LLP

(57) ABSTRACT

There is provided a recognition system capable of correctly recognizing nodding action of a user and controlling interaction reflecting the user's intention. The instruction recognition system includes a gesture recognition section for recognizing the user's nodding action on the basis of a photographed image of the user's head; a line-of-sight detection section for detecting the line of the user's sight; a display section for indicating image data; and a controller which determines the candidate for selection, toward which the line of sight is directed, to be selected and which performs predetermined processing when the nodding action recognition section detects nodding action and when the line of sight detected by the line-of-sight detection section is oriented toward any one of the candidates for selection during the nodding action, while the system awaits the user's instruction and one or a plurality of candidates for selection are displayed on the display section.

17 Claims, 11 Drawing Sheets

INSTRUCTION RECOGNITION SYSTEM HAVING GESTURE RECOGNITION FUNCTION

BACKGROUND OF THE INVENTION

1. Field of the Invention

The present invention relates to a instruction recognition system having a gesture recognition function, and more particularly, to a system which performs user interaction.

2. Description of the Invention

A conventional practice has been to photograph a person through use of a camera, to detect the head of the person, and to perform predetermined processing on the basis of the recognition results.

For example, an interaction processing system and an interaction processing method, both being described in Japanese Patent Laid-Open No. Hei-9-218770, effects control of interaction by recognition of nodding action.

In a case where interaction is performed through mere recognition of nodding action, accurate detection of the nodding action is difficult. Since nodding action is performed sometimes without the person being aware that he is nodding, the system encounters difficulty in determining whether or not the nodding action or a like action truly reflects the user's intention while the system awaits a user's instruction. For this reason, the user's instruction cannot be recognized correctly. Further, in a case where interaction is performed through mere nodding action, detailed interaction cannot be realized. Accordingly, interaction control that correctly reflects the user's intention cannot be realized.

SUMMARY OF THE INVENTION

Accordingly, the object of the present invention is to provide a recognition system and an instruction recognition system, both of which can more correctly recognize the nodding action of a person and perform interactive control that closely reflects the user's intention.

To this end, the present invention provides an instruction recognition system having a gesture recognition function for recognizing a user's gesture, the system comprising:

a gesture recognition section for recognizing a user's gesture;

a line-of-sight detection section for detecting the line of the user's sight;

a display section for indicating image data; and a controller which performs predetermined processing on the basis of recognition results realized by the gesture recognition section when the system awaits the user's instruction while candidates for selection are indicated on the display section, provided that the line of sight detected by the line-of-sight detection section is determined to be oriented upward and that a predetermined gesture is recognized by the gesture recognition section.

While the system awaits a user's instruction, if the line of sight detected by the line-of-sight detection section is determined to be oriented upward and the gesture recognition section recognizes predetermined gesture, predetermined processing on the basis of recognition results realized by the gesture recognition section is performed. The gesture is seen to correspond to the candidate for selection to which the line of sight is directed. Even when the system performs processing based on the gesture, processing correctly reflecting the user's intention can be performed.

Preferably, the detected line of sight is determined to be oriented toward the candidate for selection on condition that the line of sight detected by the line-of-sight detection section corresponds to a gazing state where eyes remain stable for a predetermined period of time. In a case where the line of sight merely passes by, the system can eliminate the motion of the eyes irrelevant to the user's intention, thus enabling execution of processing reflecting the user's intention.

The present invention also provides an instruction recognition system having a gesture recognition function for recognizing the user's gesture, the system comprising:

a nodding action recognition section which detects the user's nodding action on the basis of a photographed image of the user's head;

a line-of-sight detection section for detecting the line of the user's sight;

a display section for indicating image data; and a controller which determines selection of the candidate for selection, toward which the line of sight is directed, and performs predetermined processing when the nodding action recognition section detects nodding action and when the line of sight detected by the line-of-sight detection section is oriented toward any one of the candidates for selection during the nodding action, while the system awaits the user's instruction and one or a plurality of candidates for selection are displayed on the display section.

While the system awaits a user's instruction, the nodding action recognition section detects nodding action, and the line of sight detected by the line-of-sight detection section is determined to be oriented toward any one of candidates for selection during the nodding action. In a case where nodding action is detected and the line of sight is oriented toward any of the candidates for selection while the system awaits an instruction from the user, predetermined processing is effected, provided that the candidate toward which the line of sight is oriented is selected. As a result, processing is performed on the assumption that the nodding action is directed toward the candidate toward which the line of sight is directed, thus enabling execution of processing correctly reflecting the user's intention.

Preferably, the gazing state corresponds to a state in which the line of sight is directed toward a predetermined candidate for selection from the beginning of the nodding action to the end thereof. As a result, the user's intention of selection of the candidate to which the eyes of the user are directed can correctly be reflected on the processing.

Preferably, the nodding action recognition section recognizes nodding action when a certain portion of the user's head moves vertically within a predetermined period of time and when the amount of vertical movement exceeds a predetermined distance. Consequently, the nodding action can be detected correctly.

DESCRIPTION OF THE PREFERRED EMBODIMENT

Figure 1:
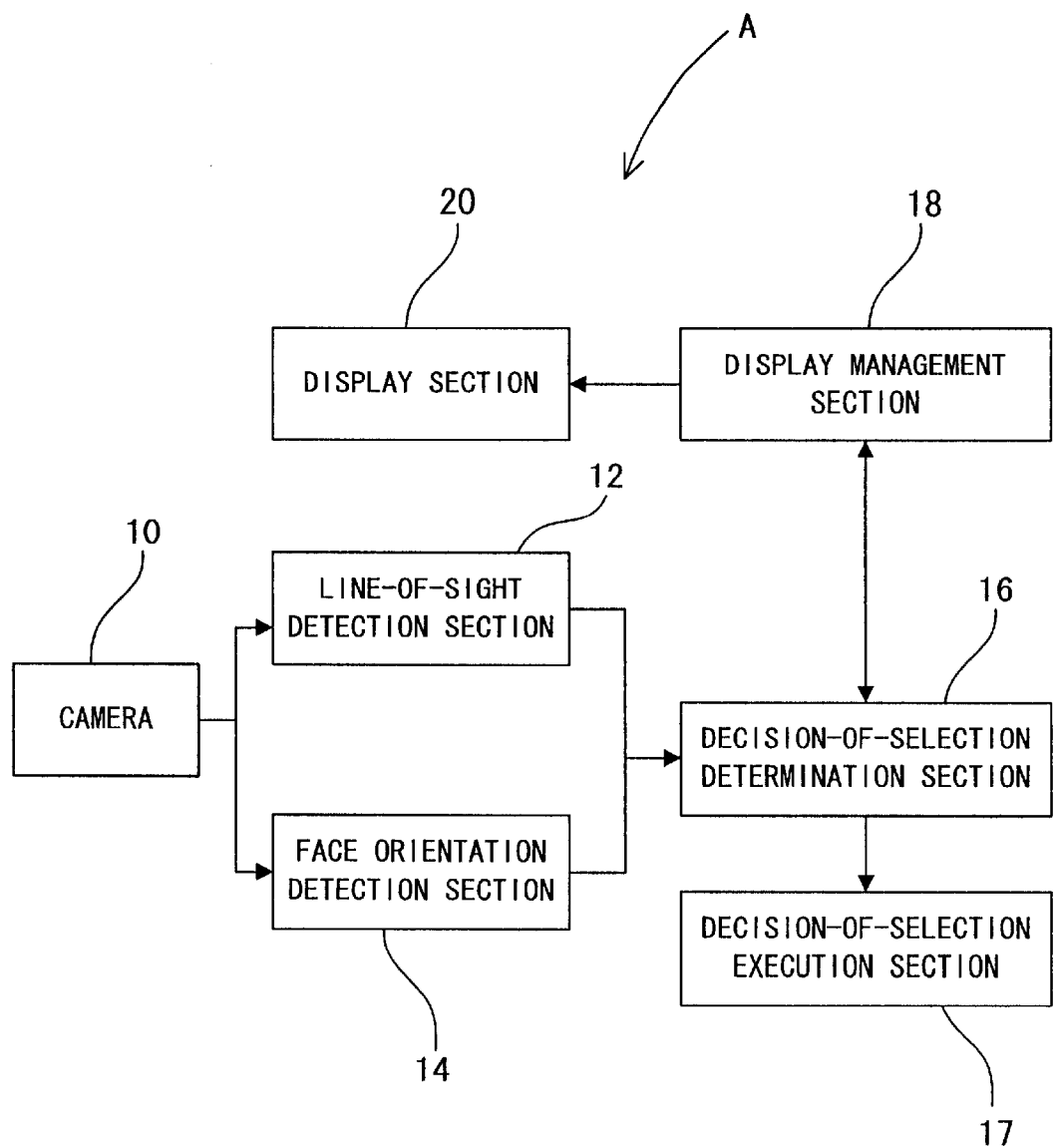
FIG. 1 is a block diagram showing the configuration of an instruction recognition system having a gesture recognition function according to an embodiment of the present invention.
Figure 2:
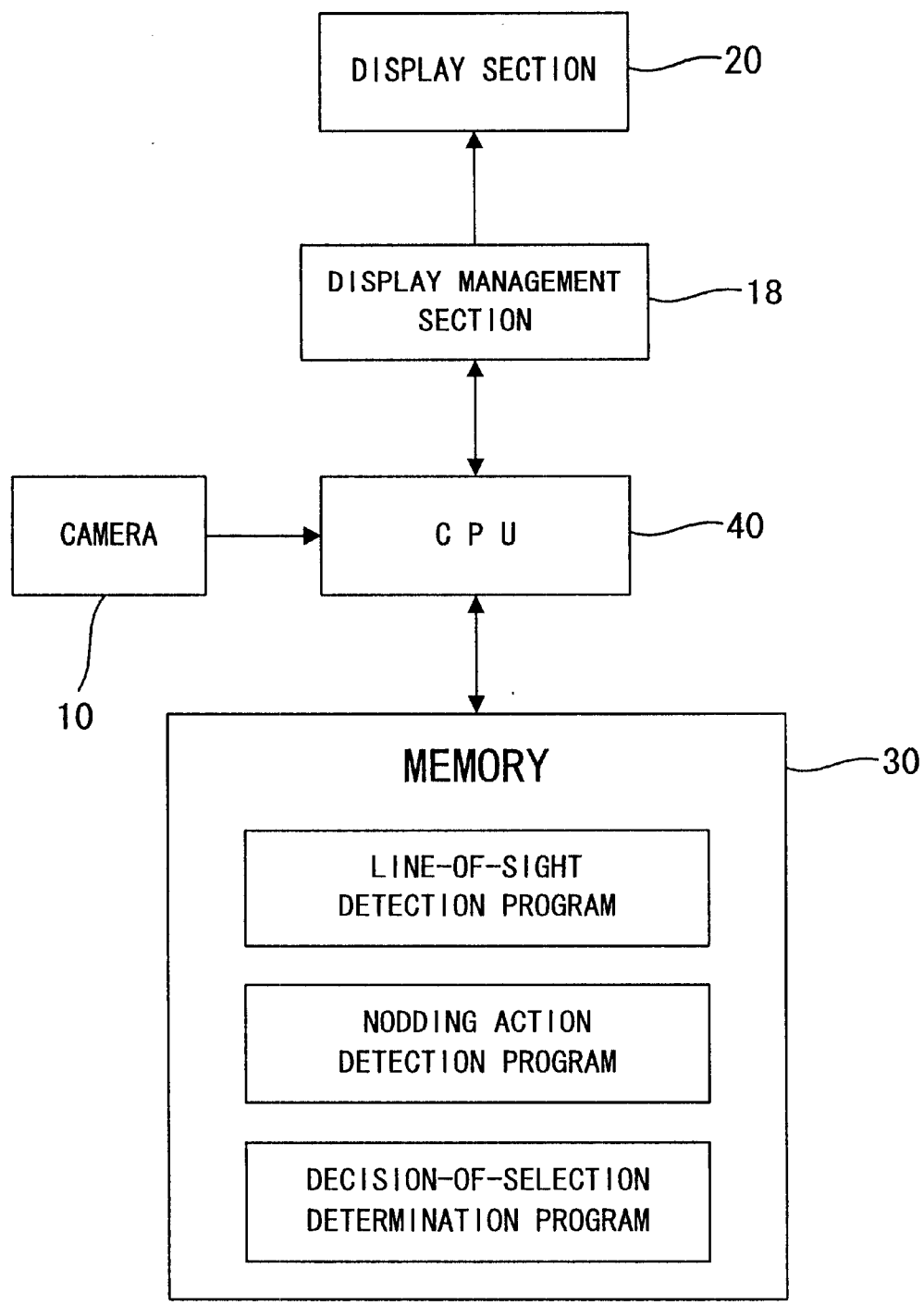
FIG. 2 is a block diagram showing the configuration of the instruction recognition system having the gesture recognition function.

A preferred embodiment of the present invention will now be described by reference to the accompanying drawings. As shown in FIGS. 1 and 2, an instruction recognition system A having a gesture recognition function according to the present invention comprises a camera 10; a line-of-sight detection section 12; a face orientation detection section 14; a decision-of-selection determination section 16; a decision-of-selection execution section 17; a display management section 18; and a display section 20.

The camera 10 is provided so as to photograph the face of user J (see FIG. 3) facing the display section 20 and is formed of a CCD camera or a like camera. The camera acts as a photography section.

The line-of-sight detection section 12 serving as the line-of-sight detection section or the line-of-sight detection means detects the line of sight of a human when image data captured by the camera 10 include a human face. More specifically, the line-of-sight detection section 12 extracts the edges of the image data obtained through photography. If the image data are determined to include a human face, the line-of-sight detection section 12 detects the line of sight of the human by detecting the orientations of the irises. Operation of the line-of-sight detection section 12 will be described in further detail later. The line-of-sight detection section 12 comprises memory which stores a program used for detecting a line of sight, and a CPU which performs predetermined processing according to the program.

The face orientation detection section 14, which acts as a gesture recognition section or a nodding action detection section or a nodding action detection means, detects the orientation of a human face when the image data photographed by the camera 10 include a human face. Under a predetermined circumstance, the face orientation detection section 14 recognizes the nodding action. Operation of the face orientation detection section 14 will be described in further detail later. The face orientation detection section 14 comprises memory which stores a program used for detecting a face orientation and nodding action, and a CPU which performs predetermined processing in accordance with the program.

The decision-of-selection determination section (hereinafter may also be referred to simply as a "determination section") 16 determines the user's decision of selection. When the face orientation section 14 detects nodding action, the decision-of-selection determination section 16 determines the user's decision of selection on the basis of the line of sight detected by the line-of-sight detection section 12. Specifically, if nodding action is acknowledged, the line of sight of the user is detected when the user has performed nodding action, and an icon toward which the line of sight is oriented is determined to be selected; in other words, the determination of nodding action results in execution of processing corresponding to selection of the icon. The decision-of-selection determination section 16 also comprises memory which stores a program used for performing the foregoing processing, and a CPU which performs predetermined processing in accordance with the program. The decision-of-selection determination section 16 acts as a determination section or a determination means. Operation of the decision-of-selection determination section 16 will be described in further detail later.

The decision-of-selection execution section (the decision-of-selection execution means)(hereinafter may also be referred to simply as an "execution section") 17 executes the result of the rendered by the decision-of-selection determination section 16. For example, the decision-of-selection determination section 16 determines that the user intends to select a certain icon, the system performs processing on the basis of the assumption that the icon is taken to be selected. The decision-of-selection determination section 16 and the decision-of-selection execution section 17 act as a controller. The decision-of-selection execution section 17 act as an execution section or an execution means.

The display management section 18 controls positions on the display section 20 where candidates for selection, such as icons, are indicated. The display section (the display means) 20 indicates predetermined data and is formed of a monitor, such as a CRT or a LCD.

FIG. 2 is a block diagram showing the configuration of hardware of the instruction recognition system A which has a gesture recognition function and is arranged in the manner as mentioned previously. As shown in FIG. 2, the instruction recognition system A comprises a camera 10; memory 30; a display management section 18; and a display section 20. The memory 30 reserves a line-of-sight detection program, a nodding action detection program, a decision-of-selection determination program, and like programs. The line-of-sight detection program is to detected the line of the user's sight. The nodding action detection program is to detect nodding action by detection of the orientation of the user's face. Moreover, the decision-of-selection determination program is to determine the selection corresponding to the user's intention, on the basis of the detected line-of-sight and nodding action.

Figure 3:
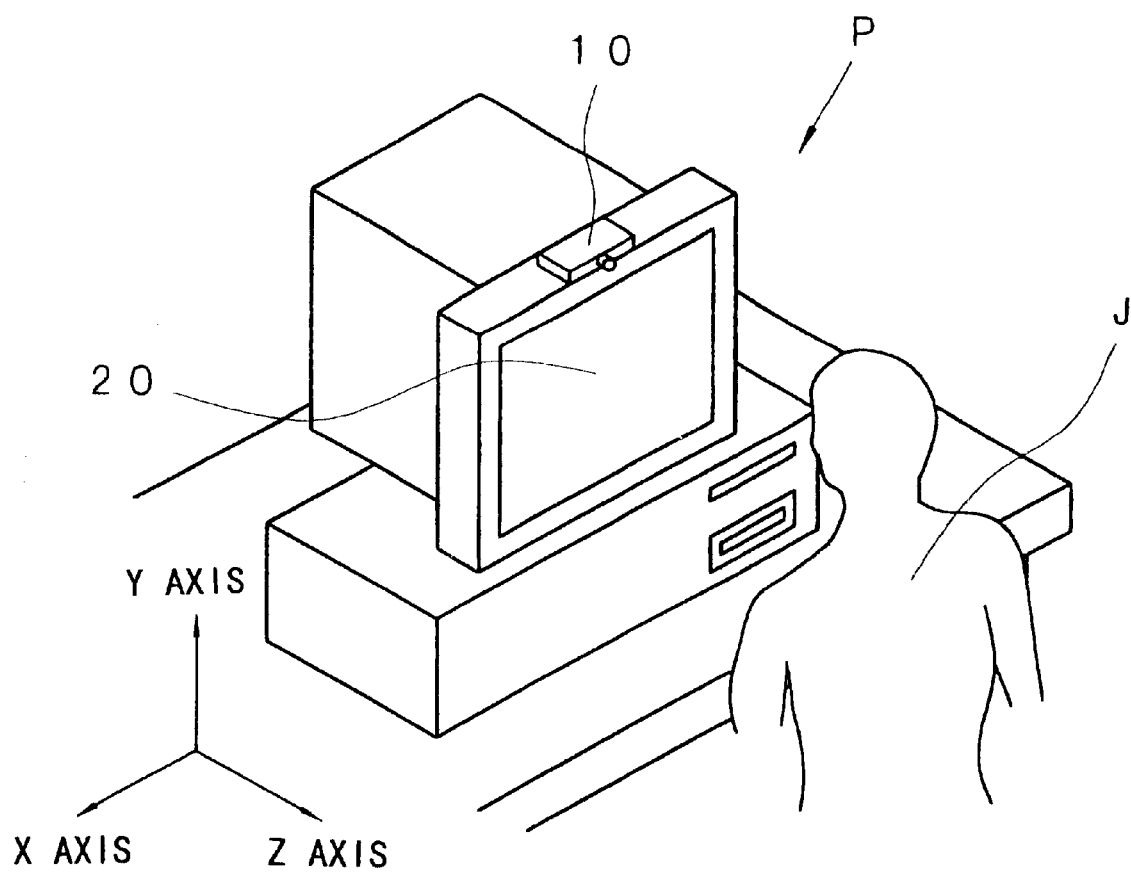
FIG. 3 is a descriptive view showing the state of use of the instruction recognition system having a gesture recognition unction according to the embodiment.

The operation of the foregoing instruction recognition system A having the gesture recognition function will now be described by reference to FIGS. 4 through 11. As shown in FIG. 3, the user is operating a computer terminal P equipped with the gesture recognition system A having the gesture recognition function of foregoing configuration.

Figure 5:
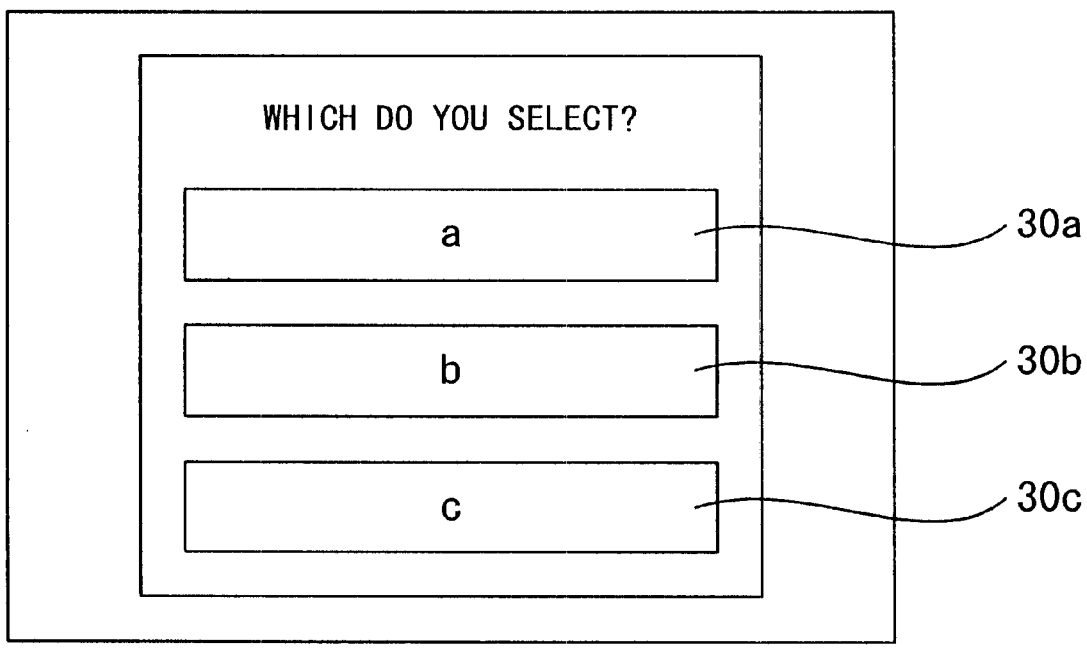
FIG. 5 is a descriptive view showing the state of use of the instruction recognition system having a gesture recognition function according to the embodiment.

First, while the user is operating the computer terminal P, a determination is made as to whether or not the instruction recognition system awaits a user's instruction (S10). More specifically, the wait state corresponds to a state in which the user is expected to select a predetermined icon or button through use of a mouse or a like component. For instance, as shown in FIG. 5, the wait state may be exemplified by a display which states "which do you select?" and displays icons 30a, 30b, and 30c to be selected on the display section 20. In another case, at the time of execution of predetermined processing, there may be displayed an icon stating "YES" and an icon stating "NO."

When the instruction recognition system A awaits a user's instruction, the camera 10 photographs an image; that is, the user's face (S11). The thus-photographed image data are delivered to the line-of-sight detection section 12 and the face orientation detection section 14.

When the photographed image data are delivered to the line-of-sight detection section 12, the line-of-sight detection section 12 detects the lines of sight of the user. A method of detecting the line of sight of the user will now be described.

The line-of-sight detection section 12 extracts edges of the photographed image. After extraction of the edges, a determination is made as to whether or not the image includes a human face. The image from which edges are extracted is compared with a template, which is a standard personal pattern image which is prepared in advance, thereby determining whether or not the image includes a human face. A human face may also be determined to be present in consideration of flesh-colored data. A substance, which has moved, is detected from a difference in images between frames. A human face may be determined by comparison between the substance and the standard personal pattern image.

If a human face is detected, the line of sight is detected. Here, the orientations of the lines of sight are detected. The vertical and horizontal positions of eyes on the detected human face are estimated from edge information obtained by extraction of edges, and images corresponding to the eyes are clipped. Gray-scale images relating to the thus-clipped regions are produced. Subsequently, temperature distribution data relating to the positions of the irises are computed with respect to the horizontal and vertical directions. The thus-computed temperature distribution data are compared with predetermined temperature distribution data corresponding to the vertical and horizontal directions, thus calculating the degree of similarity and the orientation of the line of sight. The infrared light can be used for detecting the line of sight as another method for detecting the line of sight.

There is detected the spatial position of the line of sight whose orientation is detected. The spatial position of the line of sight is determined from the spatial coordinate positions of the person's eyes in the photographed image, as well as from the detected orientation of the line of sight. Here, the spatial coordinate positions of the eyes are detected as follows: The X and Y coordinates of the eyes shown in FIG. 3 can be determined from the coordinates of the photographed two-dimensional image. The Z coordinate positions of the eyes can be estimated from the size of the face or through use of a range sensor. Alternatively, the Z coordinate positions of the eyes may be computed on the basis of the period of time during which predetermined light is reflected from the face or the eyes after having been illuminated.

As mentioned above, the spatial positions of the lines of sight are determined from the spatial positions of the eyes and the orientation of the lines of sight. Accordingly, the locations of the lines on the display section 20 may be determined. The line-of-sight detection processing is performed continuously until determination relating to Step 14 is completed.

Here, at the time of detection of the line of sight, lines of sight of both eyes or a line of sight of a single eye may be detected. Preferably, the lines of sight of both eyes are detected.

Figure 6:
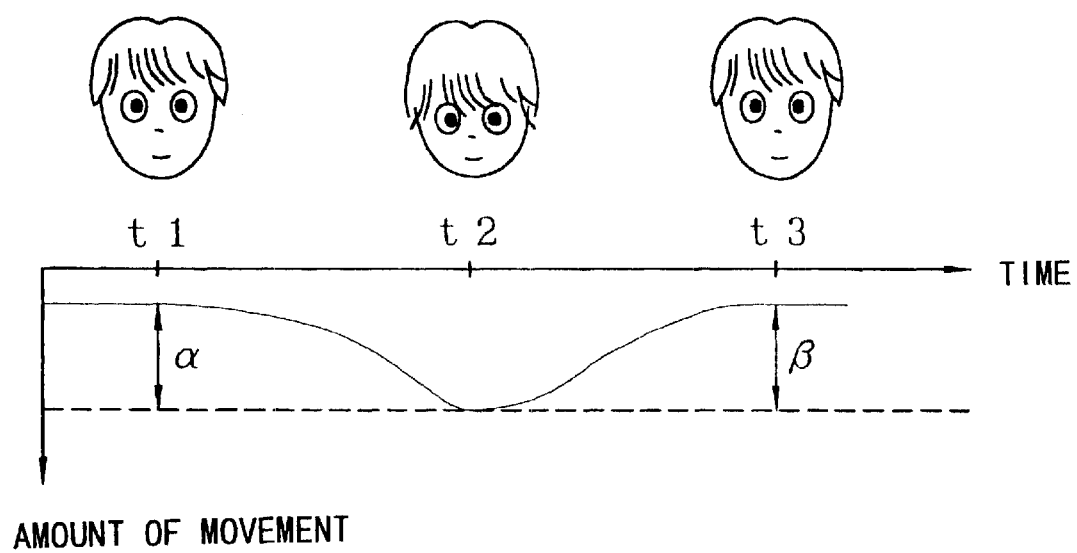
FIG. 6 is a descriptive view for describing the operation of the instruction recognition system having a gesture recognition function according to the embodiment.

If the line of sight has been detected, the system detects a gesture (S13); the system determines whether or not the user has performed nodding action through use of the face orientation detection section 14. Specifically, the positions of the eyes are determined from the image data pertaining to the face photographed by the camera 10. If the amount of vertical eye movement exceeds a predetermined value, the system acknowledges that the user has performed a nodding action. In contrast, if the amount of vertical eye movement does not exceed the predetermined value, the system acknowledges that the user has not performed any nodding action. The positions of the eyes can be determined by detection of horizontal edges effected through edge detection processing. For example, as shown in FIG. 6, in a case where the eyes' positions move along a curve plotted between time t1 to t3, if the amount of downward movement $\alpha$ and the amount of upward movement $\beta$ exceed predetermined threshold values, the system acknowledges that the user has performed a nodding action. The system may also be set as follows. Namely, the allowable amount of time between time t1 and time t3 is set in advance. Even when the amount of vertical eye movement exceeds a predetermined value, if the eye movement takes a considerably long period of time, the system may be set so as not to acknowledge that the user has performed a nodding action.

For instance, the system performs sampling by detection of eyes' positions at time t1, time t2, and time t3. The amount of movement of and direction of eyes effected from time t1 to t2 are computed. Further, the amount of movement of and direction of eyes effected from time t2 to t3 are computed. In this case, the direction of eye movement requires a determination, effected by means of computation, as to whether eye movement includes upward or downward components. The system determines that the user has performed a nodding action, provided that the amount of eye movement between time t1 and time t2 and the amount of eye movement between time t2 and time t3 exceed a predetermined value, that the eye movement effected between time t1 and time t2 includes downward components, and that the eye movement effected between time t2 and time t3 includes upward components.

In the above description, the amount and direction of eye movement effected between a certain sampling time and another sampling time preceding the sampling time are detected. Alternatively, the amounts and directions of eye movements effected between a certain sampling time and a plurality of sampling times preceding the sampling time may be detected. Although in the present embodiment the amount and direction of eye movement are determined from adjacent samples, determination of the amount of direction of eye movement is not necessarily limited to adjacent samples.

Figure 7:
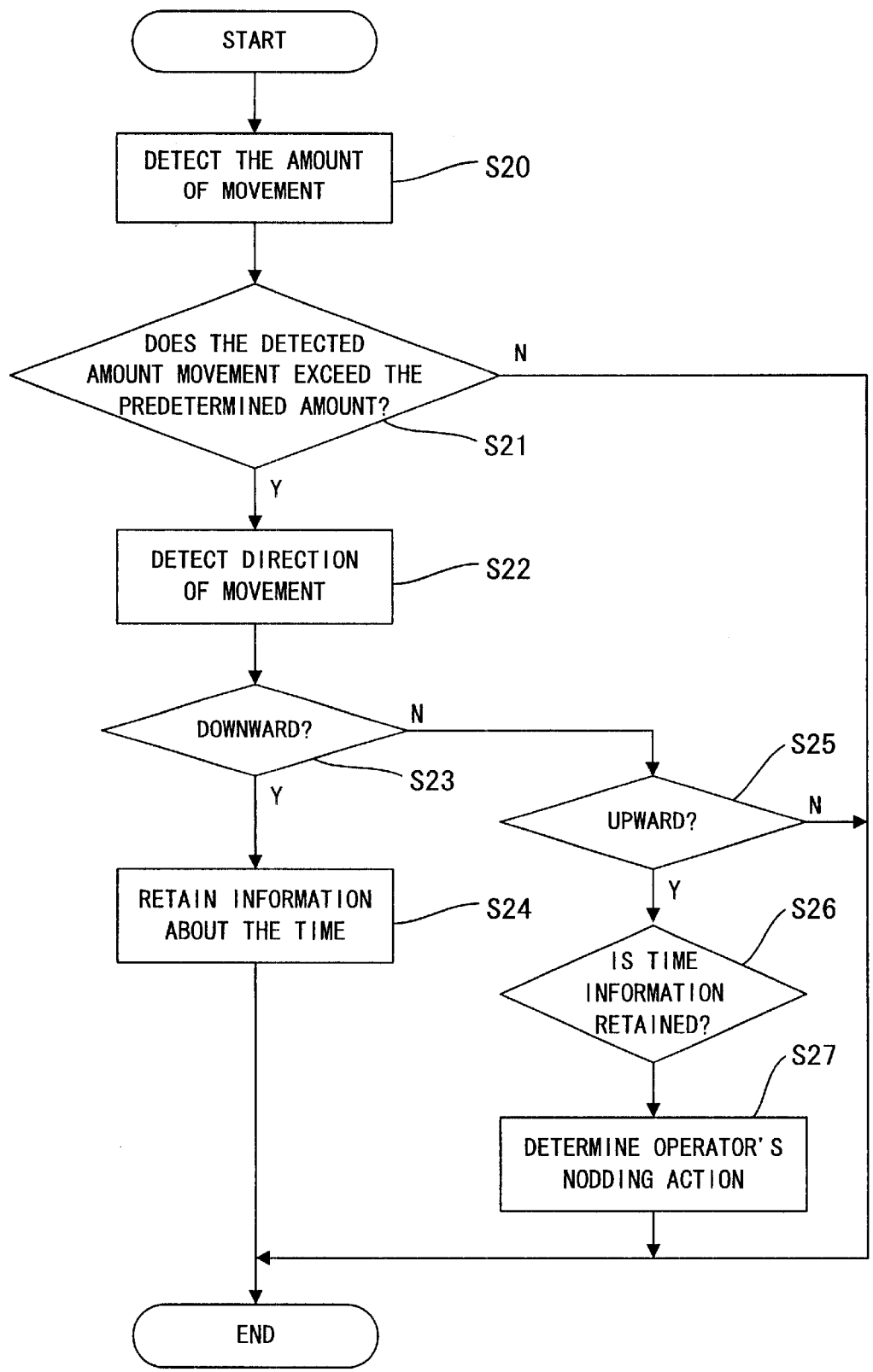
FIG. 7 is a flowchart showing detection of nodding action.

More specifically, the system performs processing such as that provided in a flowchart shown in FIG. 7. Eyes' positions are sampled at a certain sampling cycle, and the amount of eye movement is detected at a certain sampling time (this sampling time is taken as a "sampling time of interest") (S20). A determination is made as to whether or not the amount of eye movement exceeds a predetermined value (S21). At the time of determination of the amount of eye movement, there are computed the amount of eye movement effected between the sampling time of interest and the sampling time preceding the immediately-previous sampling time, as well as the amount of eye movement effected between the sampling time of interest and an immediately preceding the sampling time of interest. In this case, the amount of movement of and the direction of eyes effected from a sampling time immediately before the sampling time of interest to the sampling time of interest are computed.

Alternatively, the amount of movement of eyes effected from a sampling time before the previous sampling time to the sampling time of interest, and the direction of eye movement during the period of time are computed. If the amount of eye movement exceeds a predetermined value, the direction of eye movement is detected (S22). Here, the system determines whether the eye movement includes upward components or downward components. If downward components are included, data pertaining to the sampling time at which the downward components are sampled have been retained (S23 and S24). In contrast, if the upward components are included, a determination is made as to whether or not sampling time data have been retained within a certain time period before the sampling time at which the upward components were sampled (S25 and S26). If the sampling time data have been retained within a predetermined time period, the system determines the eye movement to have been nodding action (S27). Processing pertaining to steps S20 to S27 is performed every sampling cycle.

Figure 8:
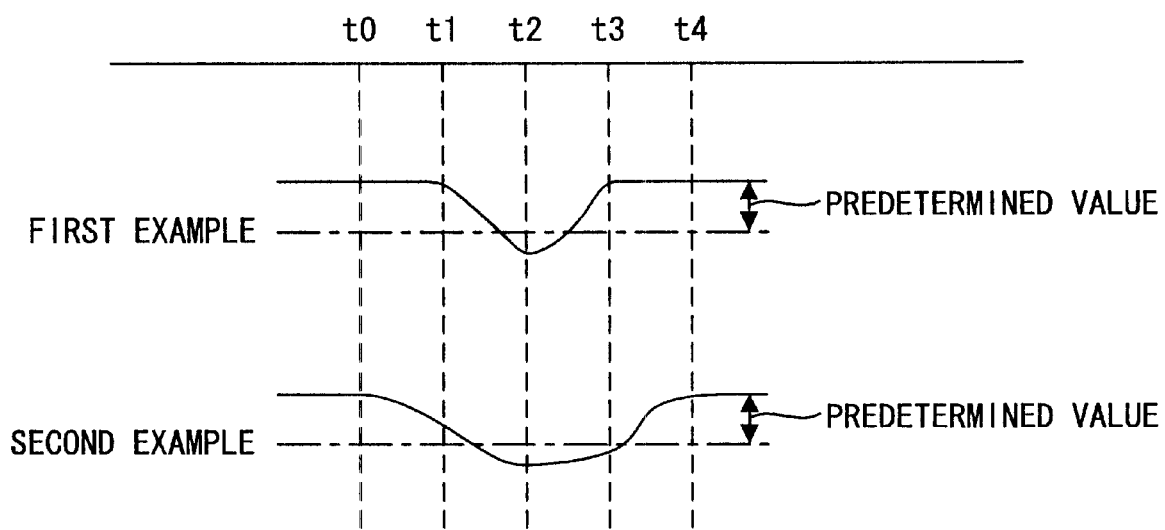
FIG. 8 is a descriptive view for describing detection of nodding action.

The foregoing processing will be more specifically explained by reference to FIG. 8. In FIG. 8, t0 to t4 designate sampling times, and curves represent eye movement. In the first example shown in FIG. 8, eye movement effected between sampling time t0 and sampling time t2, specifically between sampling time t1 and sampling time t2, exceeds a predetermined value, and processing proceeds from step 521 to step S22 at sampling time t2. Since eyes move downward from sampling times t0, t1, and t2, data pertaining to sampling time t2 are retained (S24). If the direction of eye movement effected between sampling time t0 and sampling time t2 differs from the direction of eye movement effected between sampling time t1 and t2, the direction of eye movement effected during the time interval immediately preceding sampling time is prioritized. The amount of eye movement between sampling time t2 and sampling time t3 exceeds the predetermined value, and the eyes are detected to have moved upward. Therefore, in step S26 a determination is made as to whether or not sampling time data have been retained within a predetermined time period. In this case, given that the predetermined time period corresponds to a time interval among three sampling times, the time interval between sampling times t2 and t3 corresponds to one-half the predetermined time period. Consequently, the system determines that the user has performed nodding action during the period of time between sampling times t1 and t3.

In the second example shown in FIG. 8, the amount of eye movement effected between sampling time t0 and sampling time t2 exceeds the predetermined value, and processing proceeds from step S21 to S22 at sampling time t2. Further, the eyes move downward during the time interval between sampling time t0 and sampling time t2, and hence data pertaining to sampling time t2 are retained (S24). Subsequently, at sampling time t4, the amount of eye movement between sampling time t3 and sampling time t4 exceeds a predetermined value, and eyes are detected to have moved upward. Therefore, in step S26, a determination is made as to whether or not sampling time data have been retained within a predetermined time period. In this case, given that the predetermined time period corresponds to a time interval among three sampling times, the time interval between sampling times t2 and t4 corresponds to a single predetermined time period. Consequently, the system determines that the user has performed nodding action during a period of time between sampling times t0 and t4.

Through the previously-described processing, the system can detect a nodding action, regardless of whether nodding action is quick or slow.

Nodding action may be recognized by means of movement of mouth position instead of by means of eyes' positions. Thus, another horizontal edge factor of the face may also be used.

Figure 9:
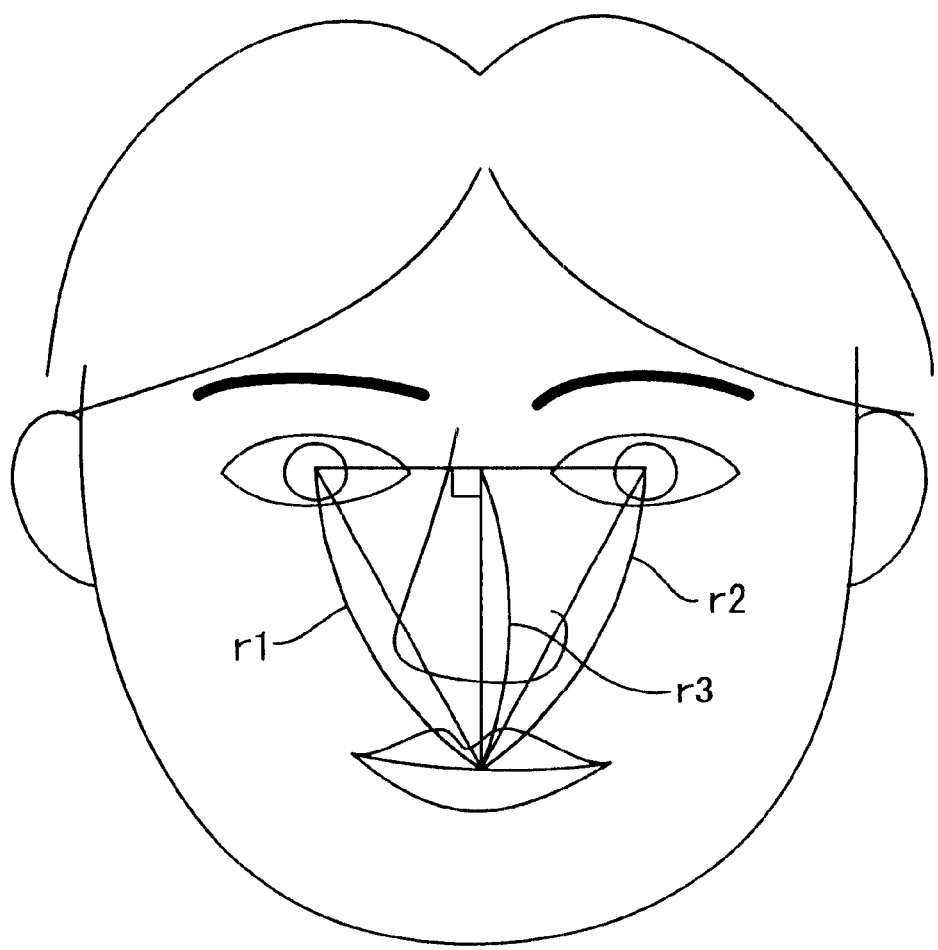
FIG. 9 is a descriptive view for describing points to be measured during detection of nodding action.

When a person casts his eyes downwardly, the distance between the eyes and the mouth becomes shorter, and the system may recognize nodding action by detection of the distance. Before the person performs nodding action, the distance between the eyes and the mouth is long. However, when the person starts nodding action, the distance becomes shorter and again becomes longer. Nodding action is detected by detection of such a change in the distance. For example, as shown in FIG. 9, a mean value of distance r1 between the center of the right eye and the center of the mouth and distance r2 between the center of the left eye and the center of the mouth are computed. The system recognizes a nodding action, given that a decrease in the mean value is followed by an increase and that the decrease and the increase both exceed a predetermined threshold value. For example, the mean value initially assumes a value of "a" and later assumes a value of "b" (b<a). Subsequently, the mean value assumes a value of "c" (c>b). If the difference between "b" and "a" and the difference between "b" and "c" exceed the predetermined threshold value, the system determines the movement of the face to have been nodding action. As in the case of the previous example, nodding action may be recognized on condition that the foregoing changes in the mean value arise within a predetermined period of time. In place of the mean value of distance r1 and distance r2, the length r3 of the normal to the line connecting the centers of the eyes (see FIG. 9) may be used as a factor representing the distance between the eyes and the mouth.

Figure 10:
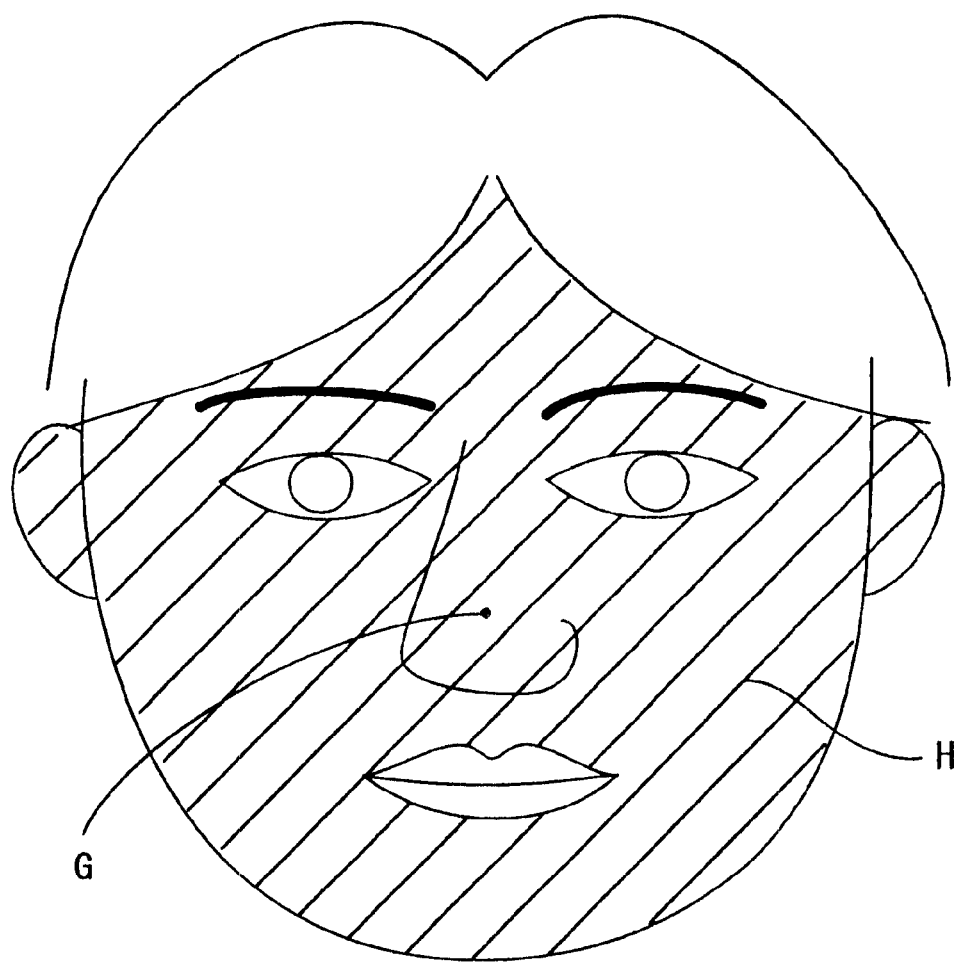
FIG. 10 is a descriptive view for describing points to be measured during detection of nodding action.
Figure 11:
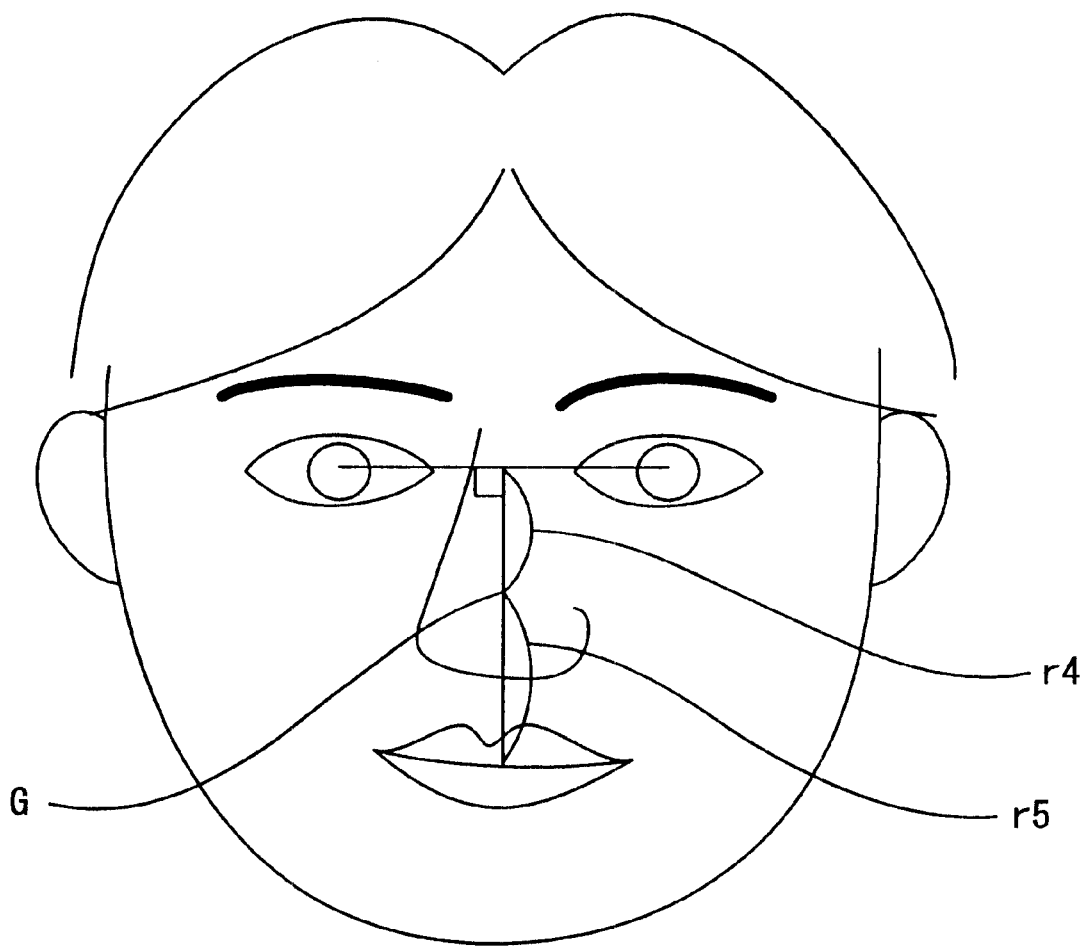
FIG. 11 is a descriptive view for describing points to be measured during detection of nodding action.

Alternatively, the system may be set so as to recognize nodding action by detection of a distance between the center of gravity of a flesh-colored region of the face and the eyes, or detection of a distance between the center of gravity and the mouth. The center of gravity of the flesh-colored region corresponds to the center of gravity of a hatched flesh-colored region H shown in FIG. 10. For example, as shown in FIG. 10, in the case of detection of a distance between the center of gravity G and the eyes, the length r4 of the normal originating at the center of gravity G to the line connecting the eye centers is measured. The system recognizes nodding action by detection of the amount of change in the length r4. Alternatively, in the case of detection of a distance between the center of gravity G and the mouth, the length r5 of a line connecting the center of gravity G and the center of the mouth is detected, and the system recognizes nodding action by detection of the amount of change in the length r5.

Alternatively, a nodding action may be detected by means of the amount of movement of the center of gravity of a triangle defined by the two eyes and the mouth, or the amount of movement of the center of gravity of a flesh-colored region.

A paper entitled "A Robust Algorithm for 3D Head Pose Estimation" [14$^{th}$ International Conference on Pattern Recognition, Vol. 1, pp. 1356 to 1359 (1998)] and paper entitled "Recognition of Facial Gestures Using the GRIP Method for Head Motion Estimation and Hidden Markov Models" [IEEE International Conference on Image Processing Vol. 4, No. 861, 1997] describe a method of estimating a face orientation, a method of estimating a face orientation from the relationship between the center of gravity of the flesh-colored region and the center of gravity of a hair region, as well as a method capable of estimating motion by the steps of select coordinates of a face wire frame model and an image having data appropriate for motion, and computing motion parameters, thereby estimating motion without involvement of substantial influence from local motion on the face or eye glasses. Through use of these methods nodding action can be detected by determination of a face orientation, and vertical movement of the face can be detected within a predetermined period of time.

After completion of recognition of the gesture, a determination is made as to whether or not the user has gazed at a candidate for selection during the gesture (S14). For example, if the system recognizes a nodding action, a determination is made as to whether or not the user has gazed at an icon or button during his nodding action. A determination as to whether or not the user has gazed at any of the candidates for selection is made on the basis of the result as to whether or not the thus-detected line-of-sight is oriented toward the candidate for selection; i.e., whether or not the line of sight detected in the previous step passes through the area where the candidates are displayed from the beginning of the nodding action to the end thereof. In a case where two lines of sight are detected, a nodding action may be determined to be performed, so long as only one of the two lines of sight is oriented toward the candidate for selection and a nodding action may be determined to be performed, so long as both of the two lines of sight are oriented toward the candidate for selection.

For example, in the example shown in FIGS. 5 and 6, a determination is made as to whether or not the user has continuously gazed at any one of the icons 30a, 30b, and 30c during the time period between sampling time t1 to sampling time t3. For instance, from time t1 to time t3 the detected line of sight passes through the area where the icon 30a is displayed, and the user is determined to have gazed during the gesture.

In the first embodiment shown in FIG. 8, if the line-of-sight has passed by the display region of a certain icon during a period of time between sampling times t1 and t3, the system determines that the user has gazed at that candidate during the gesture.

Preferably, in the example shown in FIG. 6, in a case where the user has continuously gazed at a predetermined candidate for selection during the time interval from time t1 to time t3, the user is determined to have gazed at the candidate for selection, and processing proceeds to step S15. The system may also be set such that when the user has gazed at the candidate for only a predetermined proportion of the time interval from time t1 to t3, the user is determined to have gazed at the candidate during the gesture, and processing proceeds to step S15. By determination of whether or not the user has gazed at a candidate for selection, eye movement irrelevant to the user's intention, such as mere passage of the line of sight by the candidates, can be eliminated, thus enabling processing that more correctly reflects the user's intention.

As mentioned above, if the user has gazed at a predetermined icon during nodding action, the system determines that the user intends to select the icon. Processing relating to step S14 is performed by the decision-of-selection determination section 16, on the basis of the line-of-sight data detected by the line-of-sight detection section 12, the nodding action detected by the face orientation detection section 14, and the data pertaining to the range where the icon is displayed received from the display management section 18.

The system performs processing based on the result of gesture recognition (S15). Specifically, provided that nodding action is recognized through gesture recognition processing and that a predetermined icon has been gazed at during the nodding gesture, the system performs processing which would otherwise be performed when the icon is activated, by means of the decision-of-selection execution section 17. For instance, provided that nodding action is recognized and that the user has gazed at the icon 30a shown in FIG. 5 during the nodding action, the system performs processing which would otherwise be caused by activation of the icon 30a. In contrast, if nodding action is not recognized in step S13, in step S15 the system performs processing which would otherwise be performed when no icon is activated.

Figure 4:
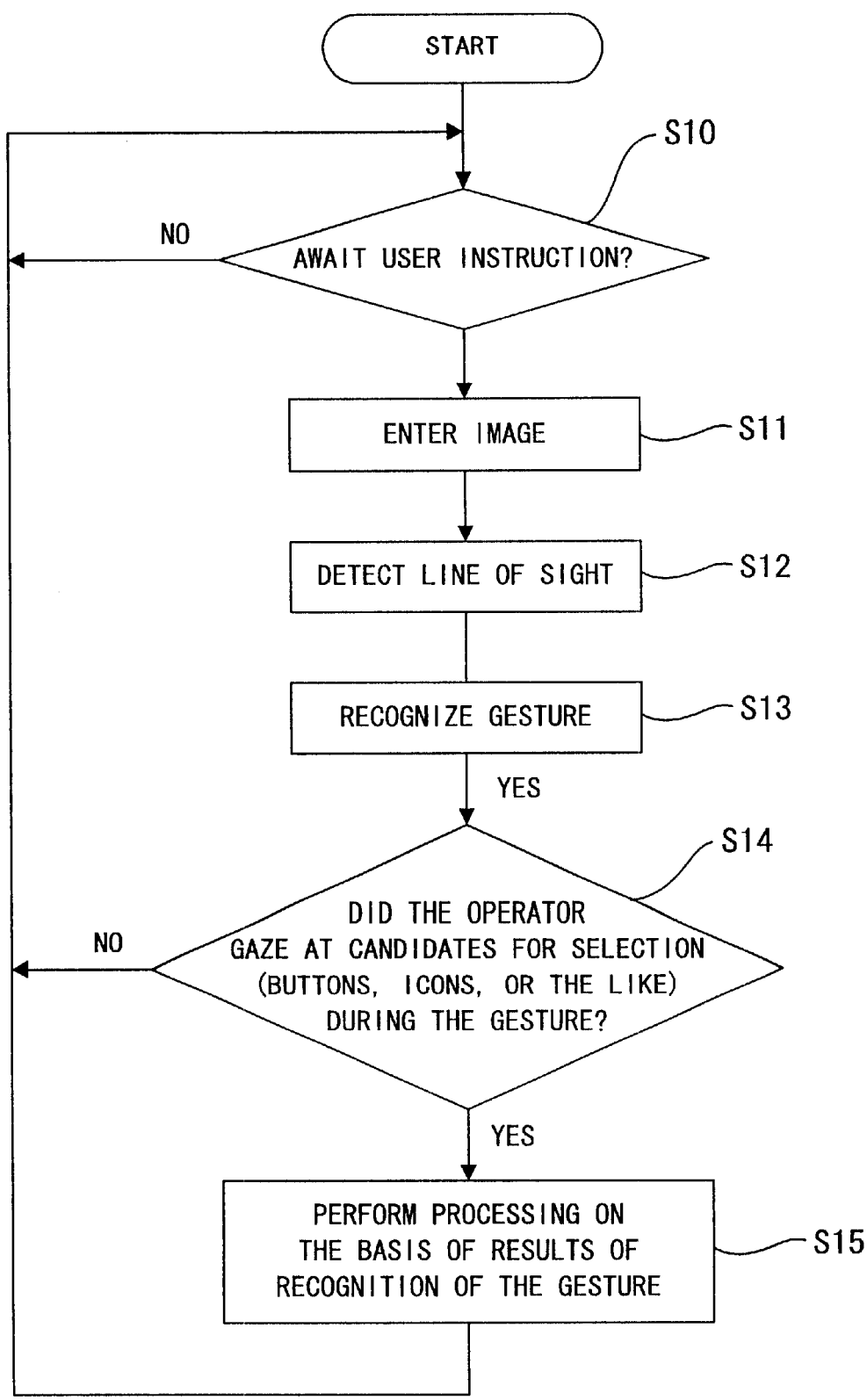
FIG. 4 is a flowchart for describing the operation of the instruction recognition system having a gesture recognition function according to the embodiment.

The operation of the instruction recognition system A has been described by reference to the flowchart shown in FIG. 4. The system may also perform processing in the following manner: Detection of a line of sight is commenced in step S12, and in next step the system determines whether or not nodding action has been performed. If nodding action is not recognized, processing returns to step S10. in contrast, if nodding action is recognized, a determination is made as to whether or not the user has gazed at a candidate for selection during the nodding action. If the user is determined to have gazed at the candidate, the system selects the thus-gazed candidate.

As mentioned above, the instruction recognition system A having a gesture recognition function according to the present invention detects nodding action and a line of sight as well, thereby correctly detecting the user's intention. Since nodding action is natural action of a human, it has conventionally been difficult to determine whether or not the user has really performed nodding action. However, the instruction recognition system A detects nodding action and the line of sight during the nodding action as well. The system can determine that the nodding action is directed toward the candidate for selection toward which the line of sight is oriented, thus more correctly detecting nodding action reflecting the user's intention.

Further, the system can determine which one of a plurality of candidates for selection is selected, by detection of nodding action and the line of sight during the nodding action, thus realizing detailed interactive processing.

As has been mentioned above, the instruction recognition system A having the gesture recognition function according to the present invention acts as a gesture recognition system and also wholly acts as an instruction recognition system for recognizing the user's instruction by virtue of the line-of-sight detection function.

Although the above embodiment has described the present invention by reference to a case where a plurality of candidates for selection are displayed in the display section 20, the present invention is not limited to such a case. The present invention may also be applied to a case where only one candidate for selection is displayed. In this case, when the user performs nodding action while gazing at the candidate for selection, the system performs processing which would otherwise be performed when the candidate is selected.

Although the above embodiment has described the present invention by reference to a case where the instruction recognition system A having the gesture recognition function is equipped with a computer terminal P, the present invention may also be applied to a case where the instruction recognition system A having the gesture recognition function is equipped with another system, for example television set.

What is claimed is:

1. An instruction recognition system having a gesture recognition function for recognizing a user's gesture, the system comprising:

a nodding action recognition section which detects the user's nodding action on the basis of a photographed image of a user's head;

a line-of-sight detection section for detecting the line of a user's sight;

a display section for indicating image data;

a determination section which determines whether or not the nodding action recognition section has detected nodding action defined as one of a down then up and an up then down head movement performed in continuum within a specified period of time and the line of sight detected by the line-of-sight detection section during the nodding action is directed toward any of the candidates for selection, while the system awaits the user's instruction and one or a plurality of candidates for selection are displayed on the display section;

an execution section which performs predetermined processing, on the assumption that the candidate toward which the line of the user's sight is directed will be selected, when the determination section determines that the nodding action recognition section has detected nodding action and that the line of sight detected by the line-of-sight detection section during the nodding action is directed toward any of the candidates for selection, while the system awaits the user's instruction and one or a plurality of candidates for selection are displayed on the display section.

2. The instruction recognition system as defined in claim 1, wherein the detected line of sight is determined to be directed toward the candidate for selection on condition that the line of sight detected by the line-of-sight detection section corresponds to a gazing state where the eyes remain fixed in one orientation for a predetermined period of time.

3. The instruction recognition system as defined in claim 2, wherein the gazing state corresponds to a state in which the line of sight is directed toward a predetermined candidate for selection from the beginning of the nodding action to the end thereof.

4. The instruction recognition system as defined in claim 1, wherein the nodding action recognition section detects nodding action according to the amount of vertical oscillation of the user's head.

5. The instruction recognition system as defined in claim 1, wherein the nodding action recognition section recognizes nodding action when a certain portion of the user's head moves vertically within a predetermined time period and when the amount of vertical movement exceeds predetermined amounts.

6. The instruction recognition system as defined in claim 1, further comprising a photography section for photographing the user's head; wherein the nodding action recognition section detects nodding action from the image data photographed by the photography section; and the line-of-sight detection section detects a line of sight from the image data produced through photography by the photography section.

7. The instruction recognition system as defined in claim 6, wherein the nodding action recognition section detects nodding action through use of at least data pertaining to the positions of the user's eyes and/or mouth of the image data produced by the photography section.

8. The instruction recognition system as defined in claim 6, wherein the nodding action recognition section detects nodding action through use of at least data pertaining to the center of gravity of a flesh-colored region on the user's head of the image data obtained by the photography section.

9. An instruction recognition system having a gesture recognition function for recognition the user's gesture, the system comprising:

a nodding action recognition means for detecting the user's nodding action defined as one of a down then up and an up then down head movement performed in continuum within a specified period of time on the basis of a photographed image of the user's head;

a line-of-sight detection means for detecting the line of the user's sight;

a display means for indicating image data;

a determination means which determines whether or not the nodding action recognition means has detected nodding action and the line of sight detected by the line-of-sight detection means during the nodding action is directed toward any of the candidates for selection, while the system awaits the user's instruction and one or a plurality of candidates for selection are displayed on the display means;

an execution means which performs predetermined processing, on the assumption that the candidate toward which the line of the user's sight is directed will be selected, when the determination means determines that the nodding action recognition means has detected nodding action and that the line of sight detected by the line-of-sight detection means during the nodding action is directed toward any of the candidates for selection, while the system awaits the user's instruction and one or a plurality of candidates for selection are displayed on the display means.

10. An instruction recognition system having a gesture recognition function for recognizing a user's gesture, the system comprising:

a photographing device for photographing a user's head;

a display device for displaying image information; and a controller performing a nodding action recognition operation for detecting the user's nodding action defined as one of a down then up and an up then down head movement performed in continuum within a specified period of time on the basis of the image photographed by the photographing device;

a line-of-sight detection operation for detecting the line of a user's sight on the basis of the image photographed by the photographing device;

a determination operation for determining whether or not the nodding action has been detected by the nodding action recognition operation and the line of sight detected by the line-of-sight detection operation during the nodding action is directed toward any of the candidates for selection, while the system awaits the user's instruction and one or a plurality of candidates for selection are displayed on the display section;

an execution operation for performing predetermined processing, on the assumption that the candidate toward which the line of the user's sight is directed will be selected, when it is determined that nodding action has been detected by the nodding action recognition operation and that the line of sight detected by the line-of-sight detection operation during the nodding action is directed toward any of the candidates for selection, while the system awaits the user's instruction and one or a plurality of candidates for selection are displayed on the display section.

11. The instruction recognition system according to claim 10, wherein the controller determines that the detected line of sight is directed toward the candidate for selection on condition that the line of sight detected by the line-of-sight detection operation corresponds to a gazing state where the eyes remain fixed in one orientation for a predetermined period of time.

12. The instruction recognition system according to claim 11,
   wherein the gazing state corresponds to a state in which the line of sight is directed toward a predetermined candidate for selection from the beginning of the nodding action to the end thereof.

13. The instruction recognition system according to claim 10, wherein during the nodding action detection operation, the controller detects nodding action according to the amount of vertical oscillation of the user's head.

14. The instruction recognition system according to claim 10, wherein during the nodding action detection operation, the controller recognizes nodding action when a certain portion of the user's head moves vertically within a predetermined time period and when the amount of vertical movement exceeds predetermined amounts.

15. The instruction recognition system according to claim 10, wherein the controller detects nodding action through use of at least data pertaining to the positions of the user's eyes and/or mouth of the image data produced by the photographing device.

16. The instruction recognition system according to claim 10, wherein the controller detects nodding action through use of at least data pertaining to the center of gravity of a flesh-colored region on the user's head of the image data obtained by the photographing device.

17. An instruction recognition system having a gesture recognition function for recognizing a user's gesture, the system comprising:
   a photographing device for photographing a user's head;
   a display device for displaying image information; and a controller performing a nodding action recognition operation for detecting the user's nodding action defined as one of a down then up and an up then down head movement performed in continuum within a specified period of time on the basis of the image photographed by the photographing device;
   a line-of-sight detection operation for detecting the line of a user's sight on the basis of the image photographed by the photographing device;
   a determination operation for determining whether or not the nodding action has been detected by the nodding action recognition operation and the line of sight detected by the line-of-sight detection operation during the nodding action is directed toward any of the candidates for selection, while the system awaits the user's instruction and one or a plurality of candidates for selection are displayed on the display section;
   an execution operation for performing predetermined processing, on the assumption that the candidate toward which the line of the user's sight is directed will be selected, when it is determined that nodding action has been detected by the nodding action recognition operation and that the line of sight detected by the line-of-sight detection operation during the nodding action is directed toward any of the candidates for selection, while the system awaits the user's instruction and one or a plurality of candidates for selection are displayed on the display section;
   wherein the controller detects nodding action through use of at least data pertaining to the positions of the user's eyes and/or mouth of the image data produced by the photographing device.

* * * * *